(12) United States Patent
Mallory

(10) Patent No.: US 6,370,047 B2
(45) Date of Patent: Apr. 9, 2002

(54) DUAL INPUT RANGE POWER SUPPLY USING TWO SERIES OR PARALLEL CONNECTED CONVERTER SECTIONS WITH AUTOMATIC POWER BALANCING

(75) Inventor: William D. Mallory, Camarillo, CA (US)

(73) Assignee: Power-One, Inc., Camarillo, CA (US)

( * ) Notice: Subject to any disclaimer, the term of this patent is extended or adjusted under 35 U.S.C. 154(b) by 0 days.

(21) Appl. No.: 09/740,110

(22) Filed: Dec. 18, 2000

Related U.S. Application Data
(60) Provisional application No. 60/188,640, filed on Mar. 10, 2000.

(51) Int. Cl.$^7$ ................................................ H02M 7/48
(52) U.S. Cl. .................................... 363/65; 363/71
(58) Field of Search ................................ 363/65, 71

(56) References Cited

U.S. PATENT DOCUMENTS 4,685,039 A  *  8/1987  Inou et al. .................... 363/16
5,684,683 A  *  11/1997  Divan et al. .................. 363/65
5,771,163 A  *  6/1998  Moriguchi et al. ............. 363/71
6,055,169 A  *  4/2000  Bowman et al. ............... 363/65

* cited by examiner

*Primary Examiner*—Adolf Deneke Berhane
(74) *Attorney, Agent, or Firm*—O'Melveny & Myers LLP

(57) ABSTRACT

A power supply comprises a first power converter having respective input and output terminals, and a second power converter having respective input and output terminals. The output terminals of the first and second power converters are connected in series to provide a combined output voltage. A switch is connected to the input terminals of the first and second power converters. The switch has a first state by which the input terminals of the first and second power converters are connected in series, and a second state by which the input terminals of the first and second power converters are connected in parallel. A pulse width modulator (PWM) unit provides a drive signal to regulate current provided to the first and second power converters. A balance winding is coupled between the first and second power converters in order to share power between these two converters when their inputs are connected in series.

20 Claims, 5 Drawing Sheets

DUAL INPUT RANGE POWER SUPPLY USING TWO SERIES OR PARALLEL CONNECTED CONVERTER SECTIONS WITH AUTOMATIC POWER BALANCING

CROSS-REFERENCE TO RELATED APPLICATION

This application claims the benefit pursuant to 35 U.S.C. § 119(e) of U.S. Provisional Application No. 60/188,640, filed Mar. 10, 2000, which application is specifically incorporated herein, in its entirety, by reference.

BACKGROUND OF THE INVENTION

1. Field of the Invention

The present invention relates to a direct current (DC) output power supply which implements an automatic power-balancing scheme enabling it to operate from two input voltage ranges. In particular, this invention achieves this duality by connecting the inputs of two power converters in either series or parallel, according to voltage supply level, and providing a balance winding unit to compensate for any power imbalance generated during operation.

2. Description of Related Art

With the increasing popularity of computers and other electronic devices over the past few years, the demand for power conversion power supplies that convert alternating current (AC) into DC has also increased. Although conventional power conversion supplies are limited to operating within one particular input voltage level, the voltage available to operate these power supplies often comes in two distinct ranges. In order for conventional power supplies to continuously operate over two input voltages, power semiconductors must be selected according to their functionality at both voltage levels. In particular, these semiconductors must simultaneously meet the voltage rating requirements of operating at the higher input voltage and the current rating requirements of operating at the lower input voltage. Semiconductors with such characteristics are very expensive though, making this design undesirable. Also, in order to meet requirements of several safety agencies, such as Underwriters Laboratories (UL), the Canadian Standards Association (CSA), and Technischer Uberwachungs-Verein (TUV), the physical spacing between primary windings and safety extra low voltage (SELV) windings inside the transformers must be designed for voltages associated with the higher input voltage range.

The most commonly used method for achieving the aforementioned duality is to switch the power supply from operating as a full-wave rectifier to a voltage doubler. In particular, these circuits provide for the automatic configuration of a power supply by switching between these two modes of operation in response to either a low AC input voltage level $V_{IN}$ or a high AC input voltage level $2 V_{IN}$. More specifically, these circuits operate as voltage doublers when the AC input signal is $V_{IN}$, and as full-wave rectifiers when the AC input signal is $2 V_{IN}$. When operating as a full-wave rectifier, these circuits simply create a DC equivalent to the AC input signal and pass it through the remainder of the circuit. When operating as a voltage doubler, these circuits create a rectified signal that is two times larger than the AC input signal. Limitations to this design include its need for separate circuits to accommodate this bimodal operation. These circuits are, however, somewhat complicated and often require excessive hardware.

Accordingly, it would be very desirable to provide a simplified power supply, which implements an automatic power-balancing scheme, to operate from two input voltage ranges.

SUMMARY OF THE INVENTION

The present invention is directed to a simplified dual input power supply that avoids the complexities of prior art power supplies through the implementation of an automatic power-balancing scheme.

In an embodiment of the invention, a power supply comprises a first power converter having respective input and output terminals, and a second power converter having respective input and output terminals. The output terminals of the first and second power converters are connected in series to provide a combined output voltage. A switch is connected to the input terminals of the first and second power converters. The switch has a first state by which the input terminals of the first and second power converters are connected in series, and a second state by which the input terminals of the first and second power converters are connected in parallel. A pulse width modulator (PWM) unit provides a drive signal to regulate current provided to the first and second power converters. The automatic power-balancing scheme is provided by a balance winding coupled between the first and second power converters in order to share power between these two converters when their inputs are connected in series.

A more complete understanding of the dual input power range power supply will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention satisfies the need for a power supply that operates over two distinct input voltage ranges. In the detailed description that follows, like element numerals are used to describe like elements illustrated in one or more of the figures.

Figure 1:
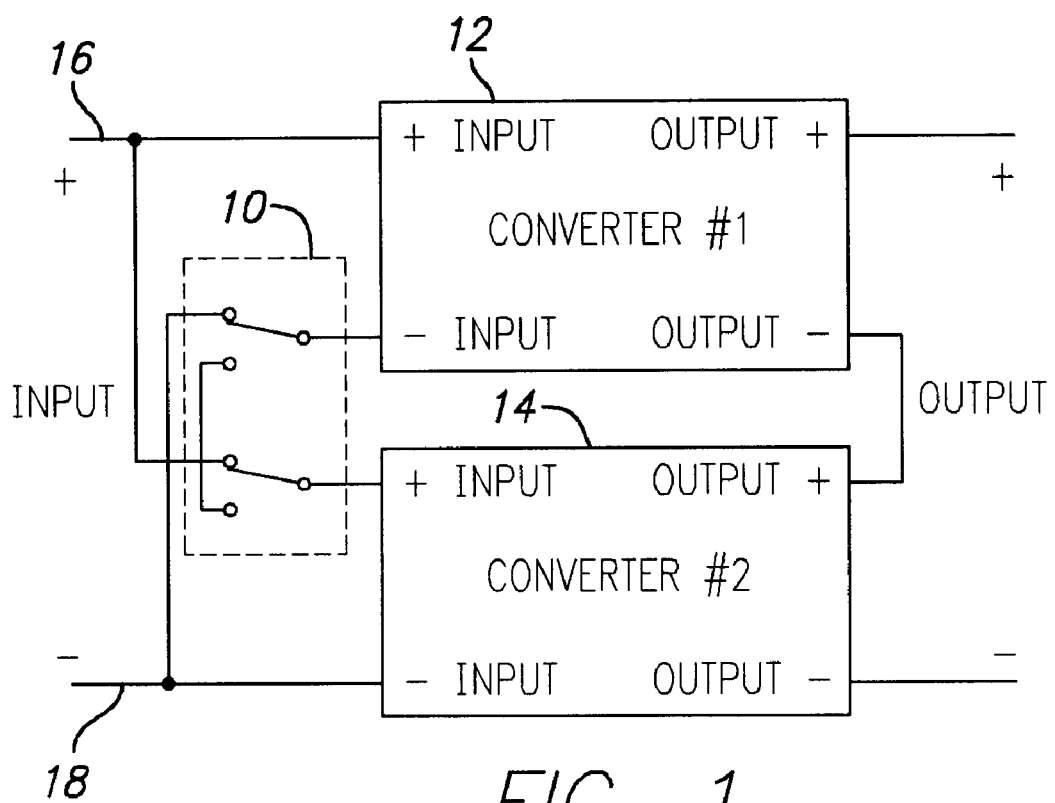
FIG. 1 is a block diagram showing a switching mechanism used to connect two power converters in either series or parallel, in accordance with the present invention.

Referring first to FIG. 1, a block diagram is shown of a switching mechanism used to connect the inputs of two identical power converters, 12 and 14 in either series or parallel, in accordance with the present invention. Each of the power converters 12 and 14 are adapted to convert an input voltage to an output voltage, and have respective input and output terminals. In particular, a connector module 10 is connected to the inputs of both converter 12 and converter 14. The outputs of converters 12 and 14, meanwhile, are always connected in series. This causes the output voltages to add and the output current of each converter to be equal since the same current flows through both output terminals.

An input voltage is applied between a positive input terminal 16 and a negative input terminal 18. The positive input terminal 16 is connected to the positive terminal of converter 12, while the negative input terminal 18 is connected to the negative terminal of converter 14. In order to connect converters 12 and 14 in parallel, the connector module 10 is in a first state in which the negative input terminal of converter 12 is connected to the negative input terminal 18 of the supply voltage and the positive terminal of converter 14 is connected to the positive input terminal 16 of the supply voltage. For a series connection, the connector module is in a second state in which the negative terminal of converter 12 is connected to the positive terminal of converter 14. The connector module 10 may be provided by a double pole, double throw switch used to connect the converter inputs in either series or parallel. Alternatively, the connector module 10 may be provided in the form of a removable plug having jumpers electrically configured to connect the respective converter inputs in series or parallel. There may further be a first plug adapted to provide a series connection, and a second plug adapted to provide a parallel connection. It should be noted that other types of switching devices could also be used to implement the connector module 10, such as semiconductor switches.

The input voltage range of this power supply is either $V_{IN}$ or 2 $V_{IN}$. When operating in the low input voltage range $V_{IN}$, the inputs to the two power converters are connected in parallel making the input voltage to each converter simply $V_{IN}$. Meanwhile, operation in the high input voltage range 2 $V_{IN}$ would require a series connection between the two converters causing the supply voltage to theoretically divide equally into each converter. As a result, the input voltage of each converter should be $V_{IN}$. In reality though, the impedances of the converters 12 and 14 are never identical causing the input supply voltage to be unevenly distributed to each converter. To circumvent this problem, a balance winding technique is used to force converters 12 and 14 to share this voltage equally, as will be described in greater detail below.

Figure 2:
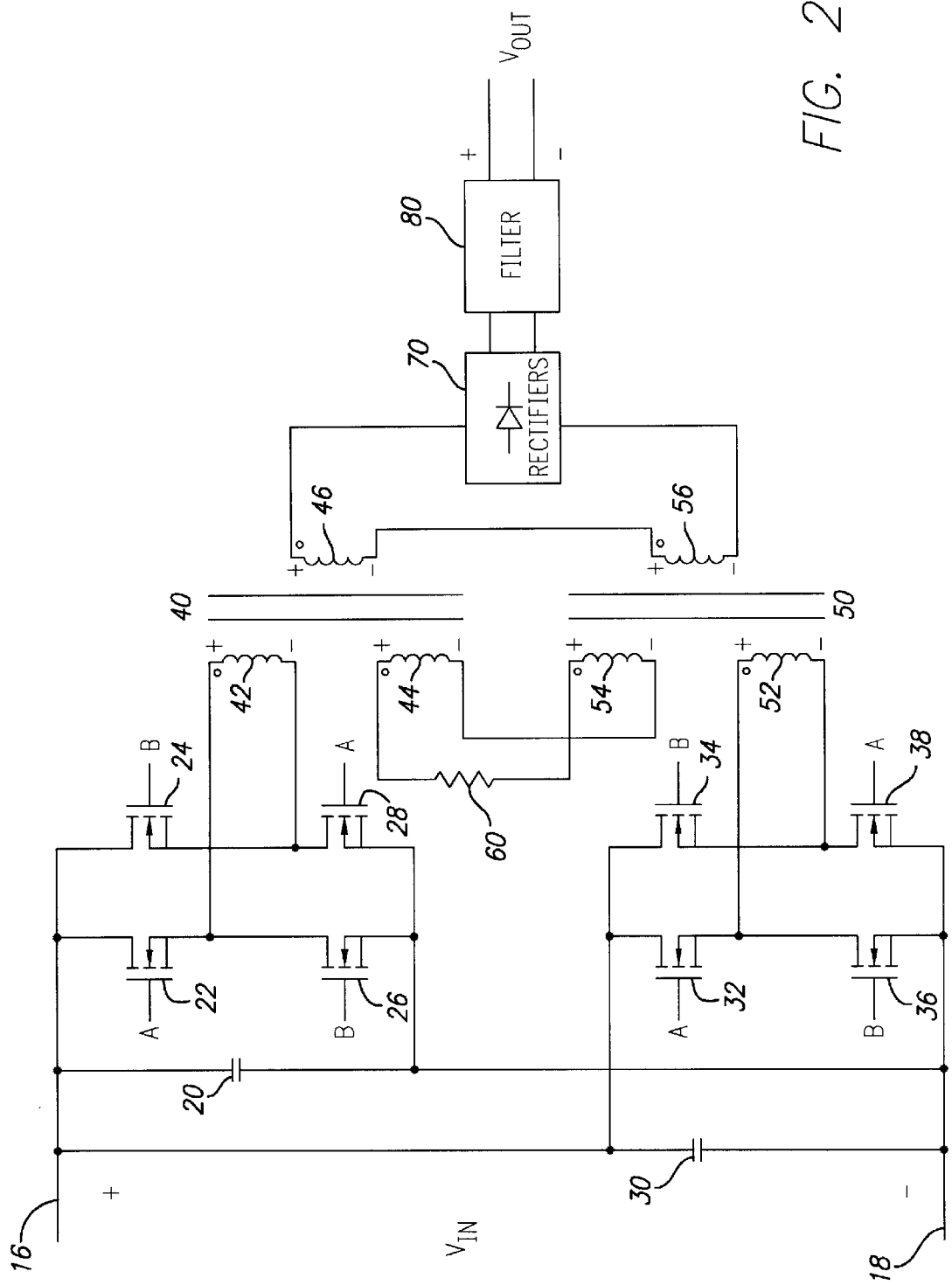
FIG. 2 is an electrical schematic diagram of a power supply switched to internally connect the inputs of two converters in parallel.

FIG. 2 shows conventional full bridge converters 12 and 14 connected in parallel to an input voltage $V_{IN}$. The internal circuitry of these converters 12 and 14 includes a primary side, secondary side, and transformer. The primary side of converter 12 is comprised of a capacitor 20, transistors 22, 24, 26, and 28, a primary winding 42, and a balance winding 44. Likewise, the primary side of converter 14 is comprised of a capacitor 30, transistors 32, 34, 36, and 38, a primary winding 52, and a balance winding 54. Capacitors 20 and 30 are respectively connected in parallel to the sources of transistors 22 and 24, and transistors 32 and 34. The drains of transistors 22 and 24, are respectively connected to the sources of transistors 26 and 28. Likewise, the drains of transistors 32 and 34 are respectively connected to the sources of transistors 36 and 38. The positive terminal of primary winding 42 is connected to the drain of transistor 22 and the source of transistor 26, while the negative terminal of primary winding 42 is connected to the drain of transistor 24 and the source of transistor 28. Primary winding 52 makes a similar connection with its positive terminal to the respective drain and source of transistors 32 and 36, and its negative terminal to the respective drain and source of transistors 34 and 38. The negative terminals of balance windings 44 and 54 are connected together, while their positive terminals are connected together via a current limiting resistor 60.

Power transformers 40 and 50 respectively separate the primary and secondary sides of converters 12 and 14. The secondary sides of converters 12 and 14 respectively include secondary windings 46 and 56 that are tied together at both terminals. The output signals from secondary windings 46 and 56 are fed through a rectifying unit 70 and then through a filter 80. It should be noted that current divides equally between converters 12 and 14 because the output of each is connected in series. Therefore, no special circuitry is needed to cause the total throughput power to divide equally between converters 12 and 14.

Figure 3:
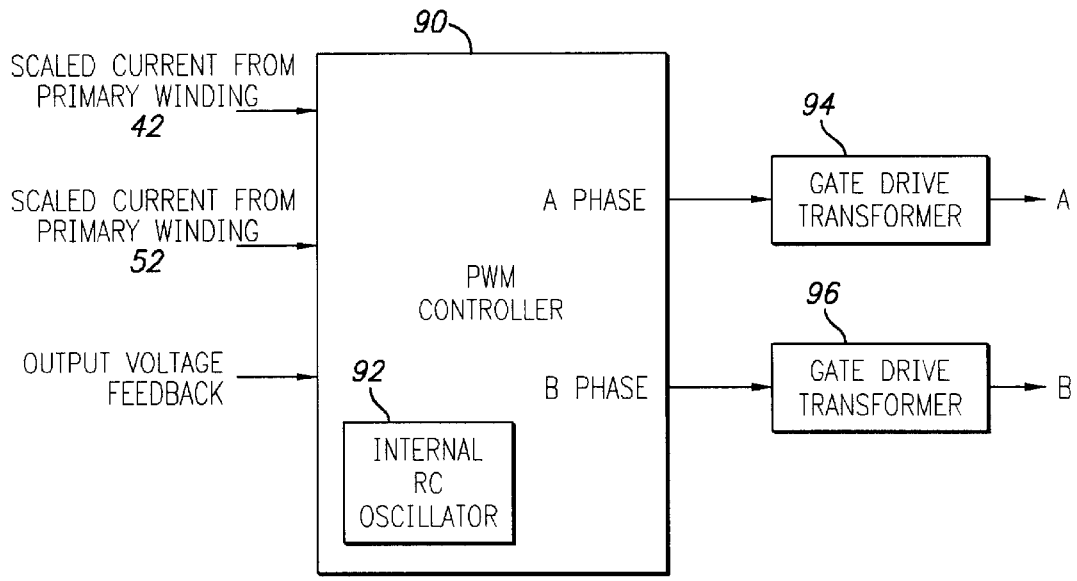
FIG. 3 is a block diagram showing the control inputs and outputs for the power supplies of FIGS. 2, 5, and 6.
Figure 4:
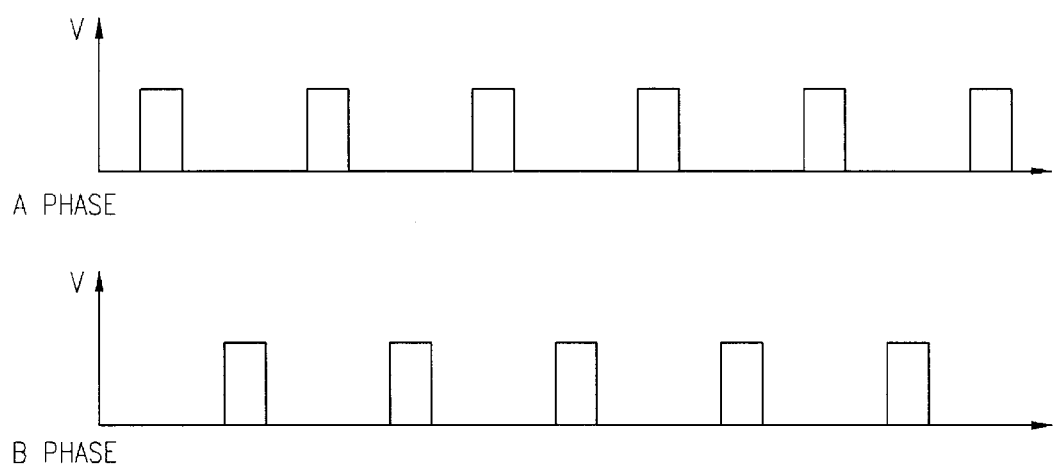
FIG. 4 is a timing diagram of the control inputs and outputs of FIG. 3.

The pulse width modulator (PWM) unit illustrated in FIG. 3 governs the control of this power supply. This PWM unit includes a PWM controller 90, an internal RC oscillator 92, and two gate drive transformers 94 and 96. Scaled current signals (e.g., 300:1) produced by current sense transformers (not shown) coupled to primary windings 42 and 52, as well as feedback from the power supply's output voltage, are connected as input signals to a PWM controller 90. These inputs, in conjunction with an internal RC oscillator 92, produce output signals A and B that are respectively connected as inputs to gate drive transformers 94 and 96. Gate drive transformer 94 is connected to the gates of transistors 22, 28, 32, and 38, while gate drive transformer 96 is connected to the gates of transistors 24, 26, 34, and 36. After passing through gate transformers 34 and 36, signals A and B are used to sequentially drive transistors 22, 24, 26, 28, 32, 34, 36, and 38 as described in FIG. 2. Waveforms of signals A and B are shown in FIG. 3.

Converter 12 operates by having transistors 22, 24, 26, and 28 switch on and off, in the proper sequence, to generate an alternating voltage on primary winding 42 of transformer 50. Transistors 32, 34, 36, and 38 perform the same operation on primary winding 52 of transformer 50 in converter 14. A single PWM circuit that simultaneously drives both converters 12 and 14 produces control signals A and B. In particular, transistors 22, 28, 32, and 38 all turn ON and OFF at the same time from the A phase gate drive signal, while transistors 24, 26, 34, and 36 all turn ON and OFF at the same time from the B phase. Next, the secondary winding of transformers 40 and 50, 46 and 56 respectively, feed a conventional rectifying unit 70. Taking this rectified signal and passing it through a filter 80 then produce the output voltage of the power supply.

Figure 5:
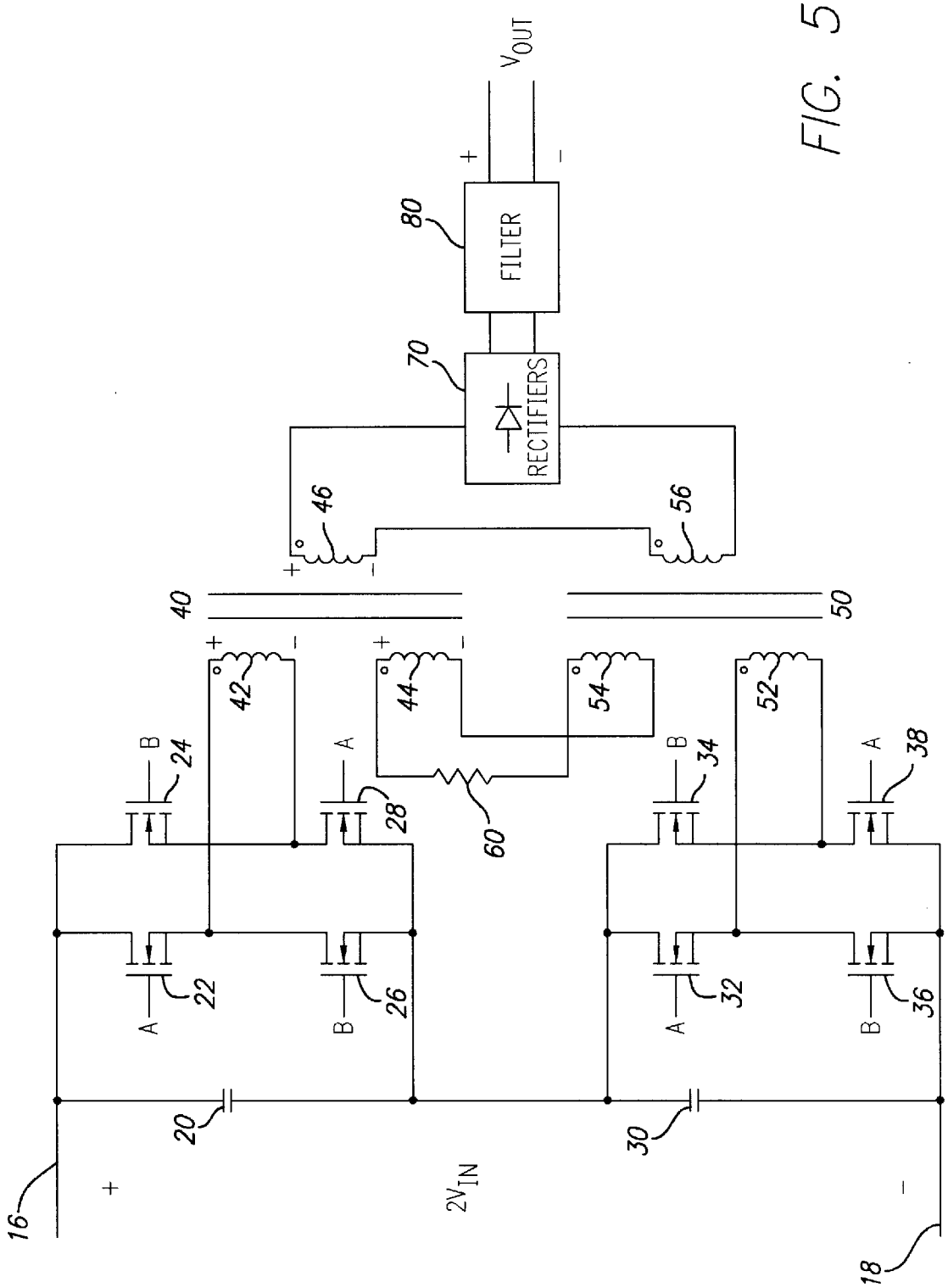
FIG. 5 is an electrical schematic diagram of the power supply switched to internally connect the inputs of two converters in series.

Although balance windings 44 and 54 are shown in FIG. 2, their inclusion does not alter operation when the power supply is operating in its parallel configuration. These balance windings 44 and 54 are only necessary for proper power sharing between converters 12 and 14 when their inputs are connected in series. FIG. 5 shows a detailed circuit schematic of the power supply with inputs to converters 12 and 14 now connected in series and with an input supply voltage raised to 2 $V_{IN}$. It should be noted that, other than these two exceptions, FIG. 5 is identical to FIG. 2.

Unlike operation in the parallel configuration, operation in the series configuration results in the negative input of converter 12 and the positive input of converter 14 having no direct connection to either input terminal 16 or 18. Because a single PWM controller 90 is used, the two converters 12 and 14 have an input characteristic that look like a constant current sink. However, due to differences in propagation delays in the MOSFET gate drive, differences in transformer magnetizing and leakage inductance and other differences between the two converters 12 and 14, the current sink characteristics are unequal. Trying to connect two devices in series, where each one requires a different amount of current flowing through it, leads to instability. This causes the connection between the negative input of converter 12 and the positive input of converter 14 to not be equal to half the input voltage as would be desired. This inequality creates an excessive voltage at the input of one converter and excessive voltage stress levels in its semiconductors and transformer. The circuit is not inherently able to correct an input voltage imbalance between the two converters once it occurs.

The solution to this problem is to add the balance winding 44 to transformer 40 and the balance winding 54 to transformer 50. By ensuring that transformers 40 and 50 respectively use identical turns ratios between primary windings 42 and 52, secondary windings 46 and 56, and balance windings 44 and 54, current will automatically transfer from one converter to the other whenever the switching transistors are on. Additional current will be drawn by the converter that has a higher input voltage, causing the input voltage to decrease. This current flows through the primary winding 42 of transformer 40, through the balance winding 44 of transformer 40, into the balance winding 54 of transformer 50 and then into the primary winding 52 of transformer 50. Transistors 32, 34, 36, and 38 rectify this current. This current will flow into the input to the converter that has a lower input voltage causing it to increase in voltage. The circuit allows current to flow in either direction until the voltage at the inputs of each converter is equal. It does not matter which converter has a higher input, the circuit will always correct the imbalance and it does so with very little power loss.

Figure 6:
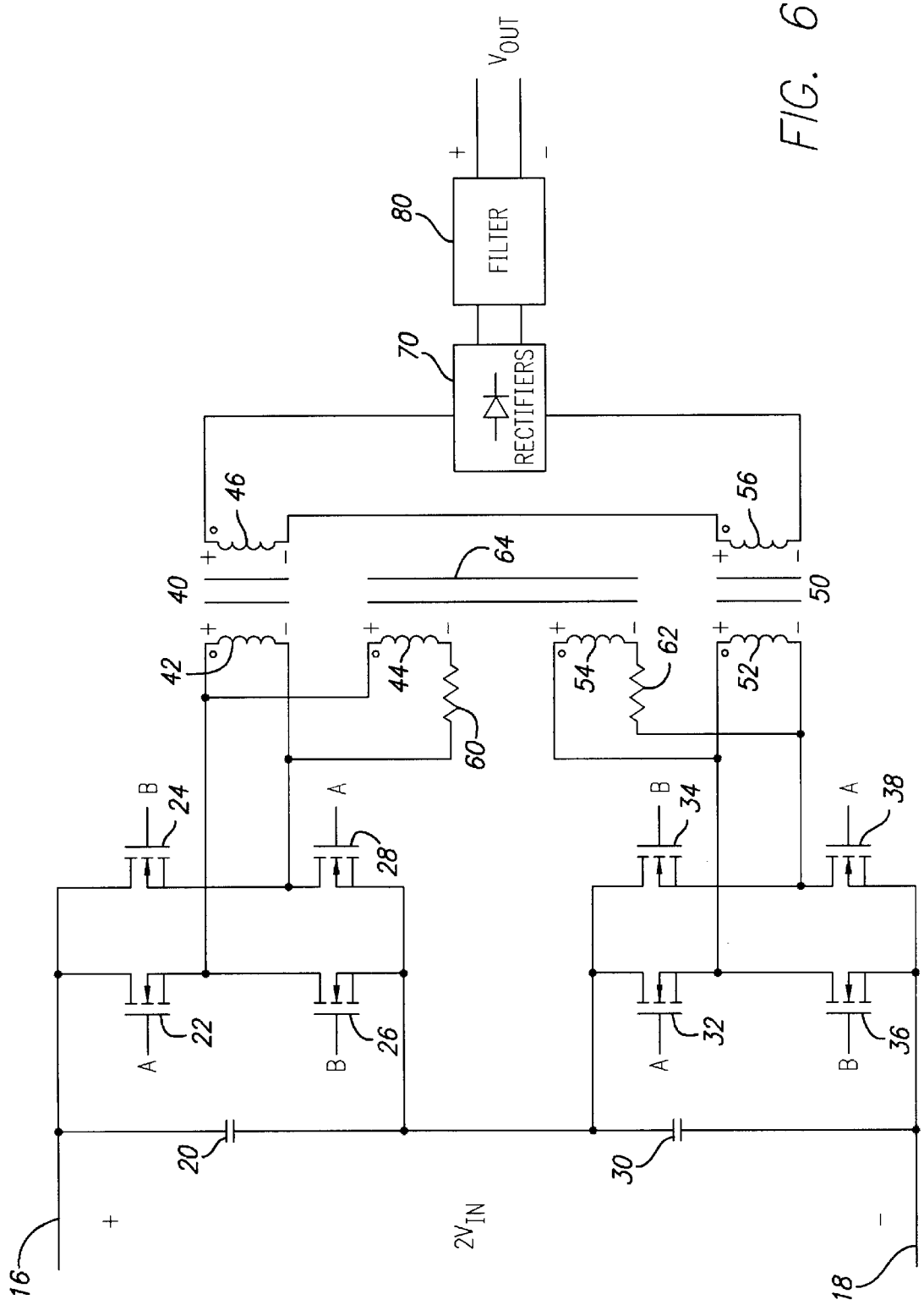
FIG. 6 is an electrical schematic diagram of an alternative method to implementing the series connection described in FIG. 5.

FIG. 6 illustrates an alternative embodiment to the circuit described in FIG. 5. By including a third transformer 64 and slightly modifying the terminal connections of balance windings 44 and 54, this circuit achieves the same automatic balancing scheme previously described. Transformer 64 has two identical, isolated windings that connect across primary windings 52 and 62, of transformers 50 and 60 respectively. The two terminals of balance winding 44 are now connected to the two terminals of primary winding 42, with one of those connections made via a current limiting resistor 60. A similar connection is made with balance winding 54, where both terminals are connected to primary winding 52, with one connection made via a current limiting resistor 62.

Having thus described a preferred embodiment of a dual range power supply, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A power supply, comprising:
   a first power converter having respective input and output terminals;
   a second power converter having respective input and output terminals, said output terminals of each of said first power converter and said second power converter being connected in series to provide a combined output voltage;
   a switch connected to said input terminals of said first power converter and said second power converter, said switch having a first state by which said input terminals of said first power converter and said second power converter are connected in series, and a second state by which said input terminals of said first power converter and said second power converter are connected in parallel; and
   a balance winding coupled between said first power converter and said second power converter, said balance winding sharing power between said first power converter and said second power converter when said switch is in said first state.

2. The power supply of claim 1, wherein each of said first power converter and said second power converter further comprises a respective transformer having a primary side and a secondary side.

3. The power supply of claim 2, wherein said balance winding is further coupled between said primary sides of said respective transformers of said first and second power converters.

4. The power supply of claim 2, wherein said balance winding further comprises an additional transformer separated from said respective transformers of said first and second power converters.

5. The power supply of claim 2, wherein each of said first power converter and said second power converter further comprises plural respective field effect transistors (FETs) coupled to said primary side of said respective transformers, said plural FETs adapted to periodically apply at least a portion of an input voltage across said primary side.

6. The power supply of claim 5, further comprising a pulse width modulator (PWM) unit providing drive signals to said plural respective FETs of said first power converter and said second power converter.

7. The power supply of claim 1, wherein said switch further comprises a double pole, double throw switch.

8. The power supply of claim 1, wherein said switch further comprises a semiconductor device.

9. The power supply of claim 1, wherein said switch further comprises a removable plug.

10. The power supply of claim 1, further comprising a pulse width modulator (PWM) unit providing drive signals to said first power converter and said second power converter.

11. A power supply, comprising:
    a first power converter having respective input and output terminals;
    a second power converter having respective input and output terminals, said output terminals of each of said first power converter and said second power converter being connected in series to provide a combined output voltage;
    means for connecting said input terminals of each of said first and second power connector to an input voltage source, said connecting means having a first state by which said input terminals of said first power converter and said second power converter are connected in series, and a second state by which said input terminals of said first power converter and said second power converter are connected in parallel; and
    means for sharing power between said first power converter and said second power converter when said switch is in said first state.

12. The power supply of claim 11, wherein each of said first power converter and said second power converter further comprises a respective transformer having a primary side and a secondary side.

13. The power supply of claim 12, wherein said power sharing means further comprising a balance winding coupled between said primary sides of said respective transformers of said first and second power converters.

14. The power supply of claim 12, wherein said power sharing means further comprises a balance winding further having an additional transformer separated from said respective transformers of said first and second power converters.

15. The power supply of claim 12, wherein each of said first power converter and said second power converter further comprises plural respective field effect transistors (FETs) coupled to said primary side of said respective transformers, said plural FETs adapted to periodically apply at least a portion of an input voltage across said primary side.

16. The power supply of claim 15, further comprising a pulse width modulator (PWM) unit providing drive signals to said plural respective FETs of each said first power converter and said second power converter.

17. The power supply of claim 11, wherein said connecting means further comprises a double pole, double throw switch.

18. The power supply of claim 11, wherein said connecting means further comprises a semiconductor device.

19. The power supply of claim 11, wherein said connecting means further comprises a removable plug.

20. The power supply of claim 11, further comprising a pulse width modulator (PWM) unit providing drive signals to said first power converter and said second power converter.

* * * * *